(12) United States Patent
Muhammad et al.

(10) Patent No.: US 12,277,762 B1
(45) Date of Patent: Apr. 15, 2025

(54) SYSTEM AND METHOD FOR DETECTING DISEASES AMONG PLANTS

(71) Applicant: KING SAUD UNIVERSITY, Riyadh (SA)

(72) Inventors: Ghulam Muhammad, Riyadh (SA); Nasser Khalid Alzamil, Riyadh (SA); Waleed Mohammad Albaqami, Riyadh (SA); Muhannad Funaysan Alanazi, Riyadh (SA); Mansour Mohammed Alsulaiman, Riyadh (SA); Mohamed Amine Mekhtiche, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/988,045

(22) Filed: Dec. 19, 2024

(51) Int. Cl.
*G06V 20/10* (2022.01)
*A01G 7/00* (2006.01)
(Continued)

(52) U.S. Cl.
CPC ............ *G06V 20/188* (2022.01); *A01G 7/00* (2013.01); *G06T 7/0012* (2013.01); *G06V 10/25* (2022.01);
(Continued)

(58) Field of Classification Search
CPC .... G06V 20/188; G06V 10/25; G06V 10/774; G06V 10/82; G06V 20/56; A01G 7/00;
(Continued)

(56) References Cited

U.S. PATENT DOCUMENTS

2022/0036070 A1* 2/2022 Yuan .................. G06N 3/084
2023/0364796 A1* 11/2023 Li ...................... H04N 13/239

FOREIGN PATENT DOCUMENTS

AU 2021104038 * 5/2022
AU 2021104038 A4 5/2022
(Continued)

OTHER PUBLICATIONS

RobHortic : A field Robot to Detect Pests and Disease in Horticultural Crops by Proximal Sensing, by Cubero et al., Agriculture 2020, 10, 276; doi: 10.3390/agriculture10070276, Published Jul. 7, 2020.*
(Continued)

*Primary Examiner* — Muhammad Shafi
(74) *Attorney, Agent, or Firm* — Nath, Goldberg & Meyer; Joshua B. Goldberg (57) ABSTRACT

A system for detecting diseases among plants includes a mobile device such as a smartphone, table, or personal computer, and a mobile robot which sends photographs of diseased plants to the mobile device including a plant name, disease type and location of the plant. The mobile robot includes a power supply, housing unit, camera, navigation unit, GPS unit, wireless transmitter, and traction unit for mobility of the robot. A geared motor drives the traction unit, and is connected to a low-level controller for motion control. A high-level controller is connected to the camera, navigation unit, GPS unit, and programmed with a convolutional neural network (CNN) configured to process images taken by the camera and associate with each image a plant type, disease type, and location of where the image was taken. The CNN may be a you only look once (YOLO) model trained with images from a dataset.

16 Claims, 8 Drawing Sheets

(51) Int. Cl.
*G06T 7/00* (2017.01)
*G06V 10/25* (2022.01)
*G06V 10/774* (2022.01)
*G06V 10/82* (2022.01)
*G06V 20/56* (2022.01)

(52) U.S. Cl.
CPC ............ *G06V 10/774* (2022.01); *G06V 10/82* (2022.01); *G06V 20/56* (2022.01); *G06T 2207/30188* (2013.01); *G06T 2207/30252* (2013.01)

(58) Field of Classification Search
CPC ......... G06T 7/0012; G06T 2207/30188; G06T 2207/30252
USPC .......................................................... 701/22
See application file for complete search history.

(56) References Cited

FOREIGN PATENT DOCUMENTS

| | | | |
|---|---|---|---|
| CN | 104330410 | * | 2/2015 |
| IN | 202011028567 | * | 8/2020 |
| IN | 202011028567 | A | 8/2020 |
| IN | 202341030894 | A | 4/2023 |
| IN | 202341030894 | * | 5/2023 |
| IN | 202341054306 | * | 9/2023 |
| IN | 202341054306 | A | 9/2023 |
| KR | 20240106610 | * | 7/2024 |
| MX | 2019-015265 | * | 6/2021 |
| MX | 2019015265 | A | 6/2021 |

OTHER PUBLICATIONS

Precision Agriculture Robot for Seeding Function and Leaf Disease Detection, by Ganesh et al.; International Journal of Engineering Research & Technology (IJERT), vol. 9 Issue 08, Aug. 2020.*

Ganesh, L. J., et al. "Precision agriculture robot for seeding function and leaf disease detection." Int. J. Eng. Res. Technol 9.8 (2020): 40-43.

Cubero, Sergio, et al. "Robhortic: A field robot to detect pests and diseases in horticultural crops by proximal sensing." Agriculture 10.7 (2020): 276.

* cited by examiner

SYSTEM AND METHOD FOR DETECTING DISEASES AMONG PLANTS

BACKGROUND OF THE INVENTION

Field of the Invention

The disclosure of the present patent application relates to systems for detecting diseases among plants, and particularly to a system using a remotely operated robot to transmit images of diseased plants to a user through a mobile application.

Description of Related Art

In Saudi Arabia, agriculture production has been on the rise. In 2021, agriculture production increased by 7.8% compared to the previous year, with an amount of 72.25 billion Saudi ryal (SAR). According to the General Authority for Statistics, the total area of organic agriculture in Saudi Arabia is 27,109 hectares for 2021, representing a 1.8% increase over 2020. Fruit (except dates) came first in the area with 13,243 hectares, represented by 48.9% of Saudi Arabia's agriculture of organic area for 2021, followed by palm trees at 23.8%. The total production of organic agricultural crops in Saudi Arabia reached 98,774 tons for 2021, with fruit (except dates) accounting for 63.3% of organic agriculture production.

In recent years, plant disease has been a serious threat to food security all around the world, including Saudi Arabia. The identification of plant disease in the early stages of the disease is very critical for the sustainability of agriculture and the food security of the world. However, identifying plant disease requires a significant amount of work, as it requires experts in the field to identify each disease, resulting in excessive time and money loss. According to the Food and Agriculture Organization (FAO) estimates, diseases, insects, and weeds cause approximately 25% of crop failure. For example, enough rice to feed the entire population of Italy is destroyed by rice blast disease every year. As another example, for human health in some parts of Africa, annual deaths have reached 250,000 by the effect of Aflatoxins. In 2007/2008 plant diseases impacted food security during the global food crisis in which food prices spiked, pushing millions of people into hunger.

Detecting diseases among crops is crucial to ensure food security, minimize financial losses, and prevent the spread of disease. There is a need, therefore, for the development of plant disease detection systems solving the aforementioned problems.

SUMMARY OF THE INVENTION

A system for detecting diseases among plants is disclosed herein, the system includes a mobile device such as a smartphone, table, or personal computer, and a mobile robot which sends photographs of diseased plants to the mobile device including a plant name, disease type and location of the plant. The mobile robot includes a power supply, such as a DC power supply, housing unit, camera, navigation unit, GPS unit, wireless transmitter, and traction component mounted to the housing unit. A geared motor drives the traction unit, the geared motor and traction component providing the motive force for the mobile robot. A motor driver is connected to the geared motor and a low-level controller is configured to control operation of the geared motor and the motor driver. A high-level controller is included, the high-level controller connected to the camera, navigation unit, GPS unit, and programmed with a convolutional neural network. The convolutional neural network is configured to process images taken by the camera and associate with each image a plant type, disease type, and location of where the image was taken. The mobile device and mobile robot are programmed with a mobile application such that the mobile device receives an image of a plant from the mobile robot and a plant name, disease type and location associated with the image.

In a non-limiting embodiment, the mobile robot may include four wheels as the traction component. Four geared motors drive the wheels, each geared motor driving a respective wheel. Two motor drivers are each connected to two geared motors, the geared motors containing encoders which provide feedback for determining speed and location of the wheels.

In a further non-limiting embodiment, the navigation unit is a light detection and ranging (LiDAR) based navigation unit. The high-level controller is connected to and communicates with the low-level controller to command motion of the robot wheels based on input from the GPS and navigation system. The low-level controller may include a microprocessor, PWM channels, analog and digital channels and an SPI serial interface. The convolutional neural network may be a you only look once (YOLO) model.

In addition, the system may include a dataset of photographic images for training the convolutional neural network. The dataset of photographic images includes various plant types and disease types associated with each plant type. The convolutional neural network is trained with images taken from among the dataset of photographic images to identify a plant type and a disease type associated with the plant type. The dataset may include processed images which are labeled with bounding boxes highlighting areas of interest and identifying a plant type and disease type with the image.

Further provided herein is a method of detecting diseases among plants. The method includes navigating a mobile robot in a crop field. The mobile robot is equipped with a power supply, housing unit, camera, navigation unit, wireless transmitter, GPS unit, a traction component mounted to the housing unit, a geared motor, and motor driver. A low-level controller is configured to control operation of the geared motor and motor driver. A high-level controller is connected to the camera, navigation unit, and GPS unit, the high-level controller programmed with a convolutional neural network. The method includes taking images of plants in the crop field using the camera of the mobile robot, processing images taken by the camera using the high-level controller, and associating with each image a plant type, disease type, and location of where the image was taken. The images are sent to a remote computing device along with a plant type, disease type, and location of where the image was taken. The method further includes sending signals from the high-level controller to the low-level controller for control of the geared motor and motor driver based on input from the GPS, and navigation system.

The method further includes training the convolutional neural network using a dataset of photographic images of various plant types and disease types associated with each plant type. The method includes processing the dataset of photographic images by applying labelled bounding boxes highlighting areas of interest, and identifying plant type and disease type, on the photographic images. A plant type may be associated with an image taken by the camera from among corn, potato, cherry, apple and tomato. The disease types, and bounding box labels, associated with cherry in the dataset of photographic images include powdery mildew. The disease types and bounding box labels associated with corn in the dataset of photographic images include grey leaf spot, common rust, and northern leaf blight. The disease types and bounding box labels associated with tomato in the dataset of photographic images include bacterial spot, early blight, late blight, leaf mold, *septoria* leaf spot, two spotted spider mite, target spot, yellow leaf curl virus, and mosaic virus. The disease types and bounding box labels associated with potato in the dataset of photographic images include early blight and late blight. The disease types and bounding box labels associated with apple in the dataset of photographic images include apple scab, black rot, and cedar apple rust.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
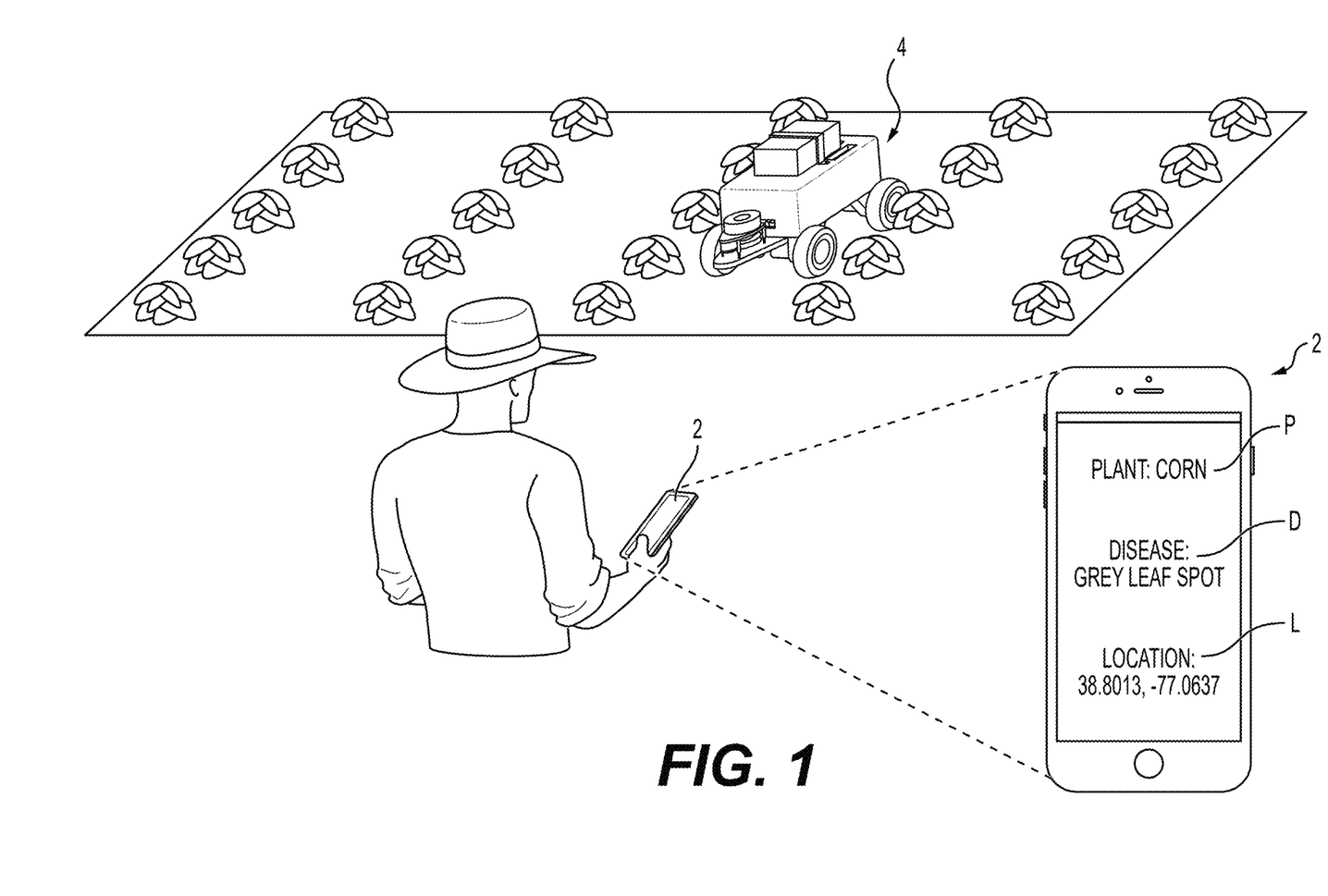
FIG. 1 is an environmental perspective view of a system for detecting diseases in plants.
Figure 2A:
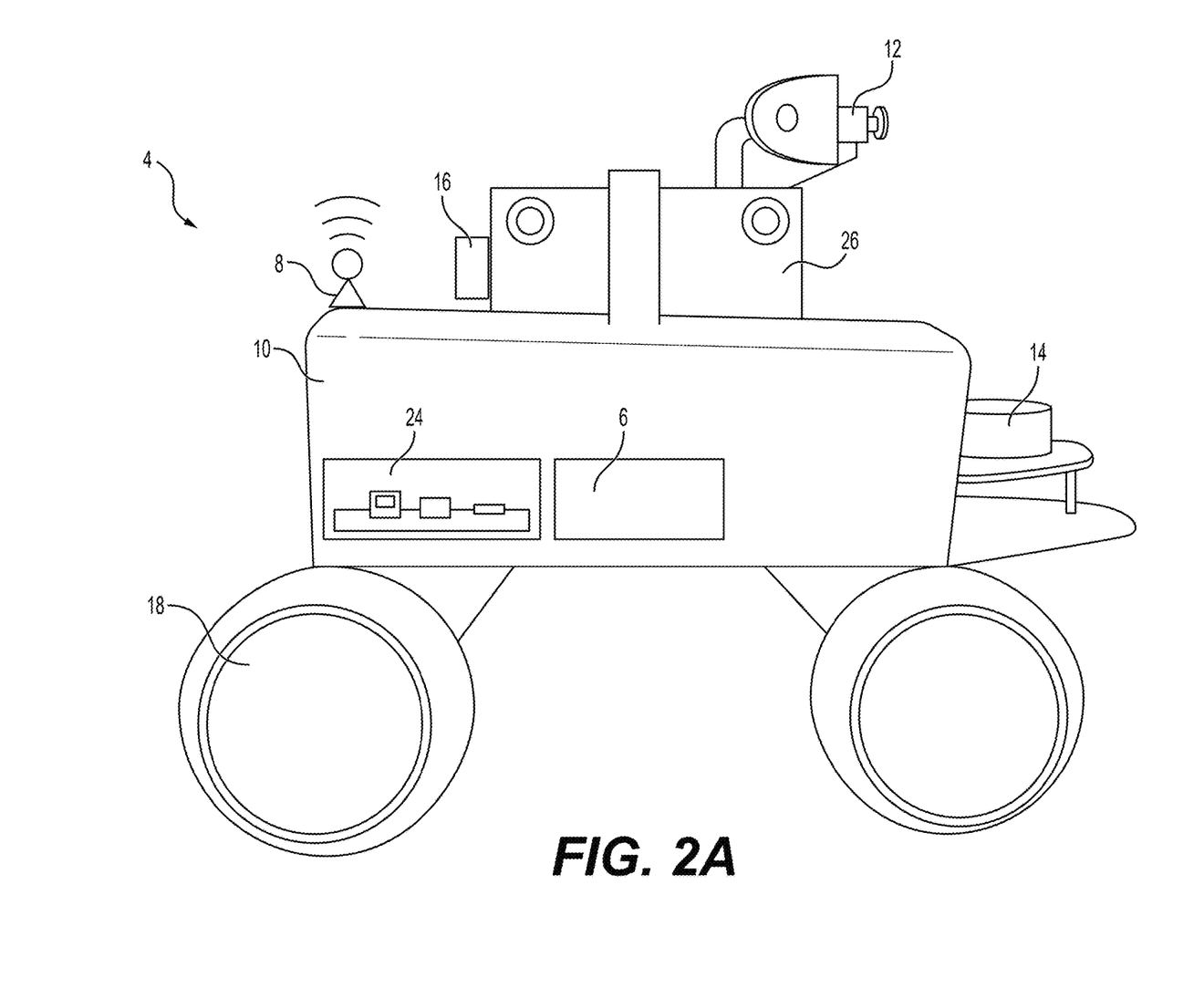
FIG. 2A is a side view of a mobile robot used in a system for detecting diseases in plants.
Figure 2B:
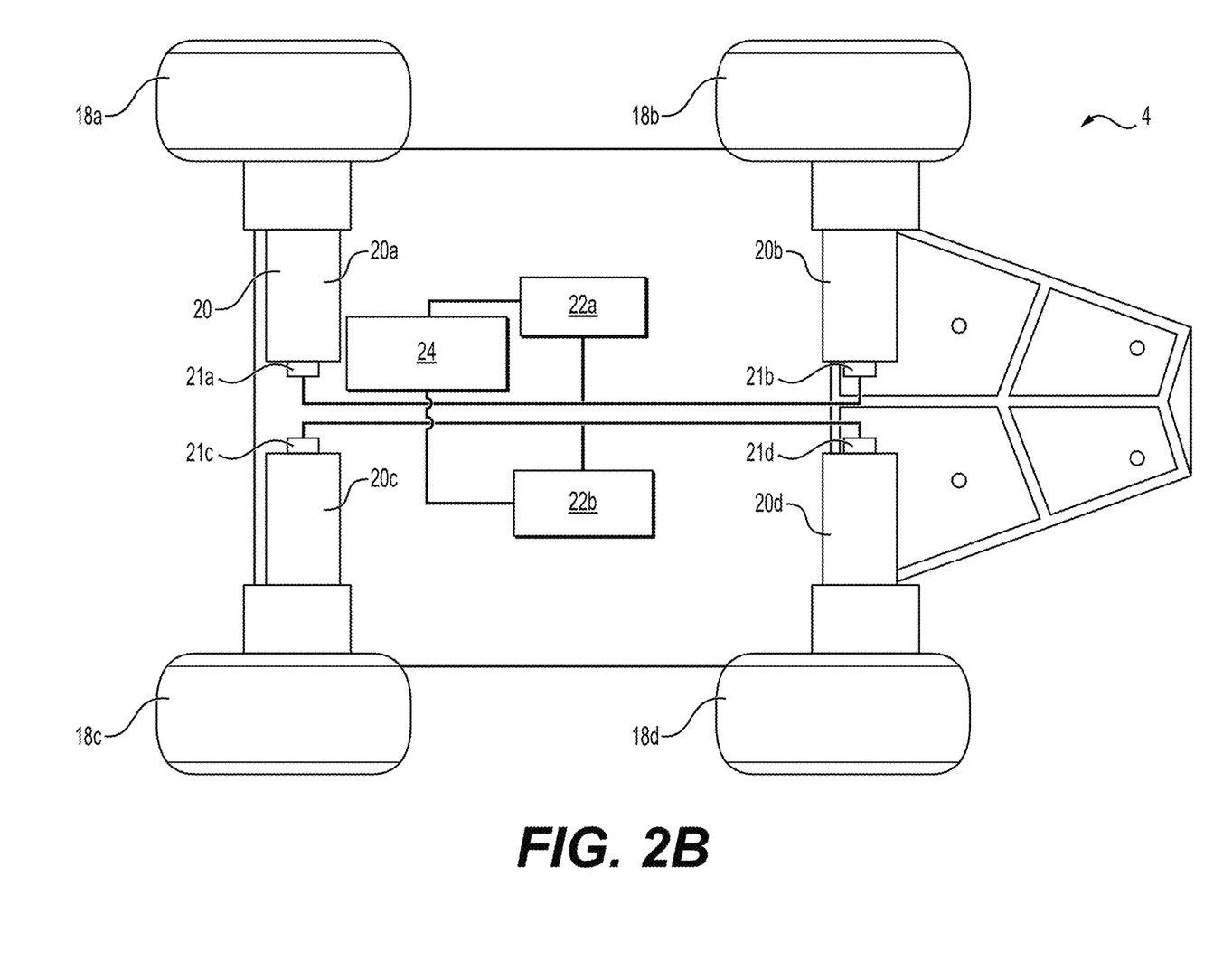
FIG. 2B is a bottom view of a mobile robot used in a system for detecting diseases in plants.

A system for detecting diseases among plants is disclosed in FIG. 1, the system includes a mobile device 2 such as a smartphone, tablet, or personal computer, and a mobile robot 4 which sends photographs and data of diseased plants to the mobile device 2. The data includes a plant name P, disease type D and location L of a diseased plant. Turning to FIGS. 2A-B, the mobile robot includes a power supply 6, such as a DC power supply, wireless transmitter 8, housing unit 10, as well as a camera 12, navigation unit 14, GPS unit 16, traction component 18 mounted to the housing unit 10, and a geared motor 20 driving the traction component 18, wherein the geared motor 20 and traction component 18 provide the motive force for the mobile robot 4. In a non-limiting embodiment, the mobile robot 4 may include four wheels 18a-d as the traction component. Four geared motors 20a-d drive the wheels 18a-d, each geared motor 20a-d driving a respective wheel 18a-d. Two motor drivers 22a, 22b act as an interface between low-level controller 24 and geared motors 20a-d, taking control signals from low-level controller 24 and supplying the appropriate power to drive geared motors 20a-d, enabling starting, stopping, and changes of speed or direction. In the example of FIG. 2B, motor driver 22a interfaces with geared motors 20a, 20b, and motor driver 22b interfaces with geared motors 20c, 20d. The geared motors 20a-d contain encoders 21a-d which provide feedback control to motor drivers 22a, 22b. In the non-limiting example of FIG. 2B, differential steering may be used wherein right-side wheels 18a, 18b and left-side wheels 18c, 18d are rotated at different speeds and directions as needed to control steering of the robot 4. However, it is noted that the example shown in the Figures is non-limiting, and other drive and steering arrangements are possible, including but not limited to the use of tracks instead of wheels, driven by more or less motors and motor drivers, and/or the use of different gearing arrangements and motor configurations.

To control velocity of mobile robot 4, motor drivers 22a, 22b receive input signals and convert the signals into appropriate voltage and current levels for the motors 20a-d. The motor drivers 22a, 22b may include a series of inputs. Input 1=Vdd and GND: these inputs provide the power supply voltage (Vdd) and ground connection (GND) for the motor driver. Input 2=ENA and ENB, which are pulse width modulation (PWM) enabler ports for the two motors controlled by each motor driver. The input enabler ports ENA and ENB receive pulse width modulation signals denoted as PWMENA and PWMENB, respectively, from low-level controller 24. PWM signals allow for control of the motor speed by adjusting duty cycle. The duty cycle is the ratio of on time to the total period of PWM signal. The PWM signals are used to control the average voltage applied to the motors, thereby regulating the speed. Input 3=IN1 and IN2, which are input control pins used to determine the direction and rotation of a first motor controlled by the motor driver. The IN1 and IN2 pins receive control signals, denoted as DIR1 and DIR2, respectively, from low-level controller 24. The control signals have two possible values: High (H) or Low (L). The combination of DIR1 and DIR2 determine the direction of rotation of the motor using the following logic: when DIR1=H and DIR2=L, the motor rotates in one direction (e.g. clockwise); when DIR1=L and DIR2=H, the motor rotates in the opposite direction (e.g., counterclockwise); when DIR1=L and DIR2=L or DIR1=H and DIR2=H, the motor is stopped. Input 4=IN3 and IN4, which are input control pins that work similarly to IN1 and IN2 but control a direction and rotation of a second motor connected to the motor driver, by receiving control signals DIR3 and DIR4 from low-level controller 24. By setting appropriate values for PWMENA, PWMENB, DIR1, DIR2, DIR3, and DIR4, precise velocity and direction control of the geared motors 20a-d, and hence the mobile robot 4, can be achieved.

Figure 3:
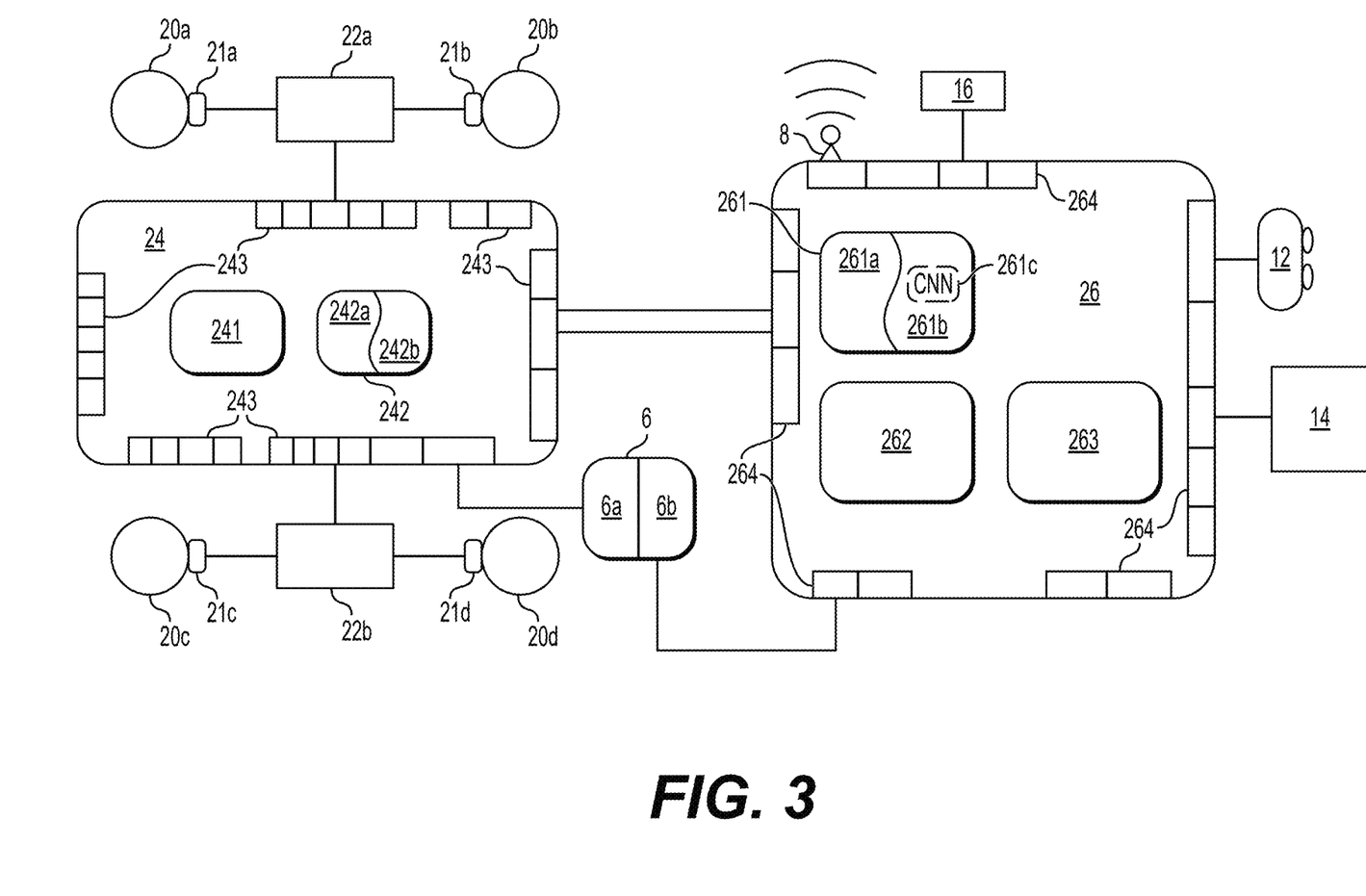
FIG. 3 is a schematic diagram of hardware components used in a mobile robot of a system for detecting diseases in plants.

Referring to FIG. 3, a diagram representation of the main hardware components of the mobile robot is provided. High-level controller 26 includes, in its basic form, a memory 261 including volatile 261a and non-volatile 261b memory. A convolutional neural network 261c is programmed into non-volatile memory 261b for recognition of plant types and diseases. A particular convolutional neural network used by the system is a you-only-look-once (YOLO) model, such as the YOLOv8 model. However, other alternatives, such as AlexNet, Mobilenet, GoogleNet, and VGG-16 could potentially be used as well. A central processing unit 262 is included as well as a graphics processor 263. Multiple input ports 264 are provided for connection of the power supply 6, wireless transmitter 8, GPS 16, navigation unit 14, camera 12, and low-level controller 24. Input ports 264 include but are not limited to USB ports, UART serial ports, camera serial interfaces, and a power jack, to name a few.

High-level controller 26 may include any central processing unit 262, graphics processor 263, and memory 261 with the capability of adequately handling the inputs from the GPS 16, navigation unit 14, camera 12 and low-level controller 24. It should be understood, that any specific hardware components mentioned are non-limiting examples, and any future or unnamed models capable of performing the functions herein may be used as hardware for the systems described.

In the development of the system described herein, the following hardware components were evaluated and considered for use in the mobile robot 4. For the high-level controller 26, a Jetson Nano, Arduino Nano 33 BLE Sense, STM32 Nucleo L432KC, and Raspberry PI 4B were considered, with the Jetson Nano chosen as a particular model due to performance and AI image processing capabilities. For the GPS 16, a GLONASS U-blox7 was chosen as a particular model for hardware compatibility.

For the navigation unit 14, a light detection and ranging navigation unit (LiDAR) was chosen. LiDAR systems use a targeted laser to measure times of reflected light returning to a receiver. The laser may be rotated to form 2D and 3D planar maps. For the navigation unit 14, the RPLidar S1, RPLidar A2M12, RPLidar A1M8, and RPLidar A2M8 were compared and evaluated, with the RPLidar A1M8 chosen as a particular model due to cost, size, and software compatibility.

For the camera 12, a stereo camera was chosen for use, which uses two or more lenses and a separate image sensor or film frame for each lens. For camera 12, several IMX models were evaluated, including, an IMX477-160, IMX462-99, IMX219-83, and IMX462-127, with the IMX219-83 chosen due to low cost and ability to form depth maps and measure object distances.

Returning back to FIG. 3, high-level controller 26 and low-level controller 24 are connected to power source 6, which may include a single or multiple power sources including a combination of DC, AC, solar, or switch mode power. In the non-limiting embodiment, power supply 6 may include two DC power supplies, shown as 6a, 6b, which may be of different voltages, for powering the low-level and high-level controllers, respectively. Alternatively, in other embodiments, a single power source or several power sources may be included with appropriate wiring and circuitry.

The low-level controller 24 includes, in its basic form, a processor 241, memory 242, and a variety of ports 243. Low-level controller 24 is in connection with and in control over motor drivers 22a, 22b, and geared motors 20a-d connected to and including encoders 21a-d. Memory 242 of low-level controller 24 may be a combination of volatile memory 242a and non-volatile memory 242b. Memory 242 may include but is not limited to flash memory, random access memory, and read only memory. Ports 243 may be a mix of both input and output ports and may include but are not limited to digital pins, analog pins, serial ports such as UART ports, I2C ports, SPI ports, voltage ports, and USB ports.

For the low-level controller 24, several Arduino models were evaluated, including the Arduino Uno, Arduino, Leonardo, and Arduino Mega as well as and ESP32 controller model, with the Arduino Mega 2560 being a particular model due to the high number of input ports, memory size, and stability for overload prevention. For the geared motors 20a-d, several models were evaluated including a Dynamixel MX-38, Lynxmotion HT1, GM37 Geared motor, and HerkuleX DRS-0602. The GM37 Geared motor was chosen as a particular model due to high torque, low cost, embedded encoder and high rpms. For the motor drivers 22a, 22b, several models were compared and evaluated, including an L9110 driver, L283D driver, L298N driver and HG7881 driver. The L298N was chosen as a particular model due to high current rating, dual-channels and low cost. As with the hardware of the high-level controller, all hardware components described with regards to the low-level controller are non-limiting examples, and may be substituted by any models capable of performing the functions recited herein.

Figure 4:
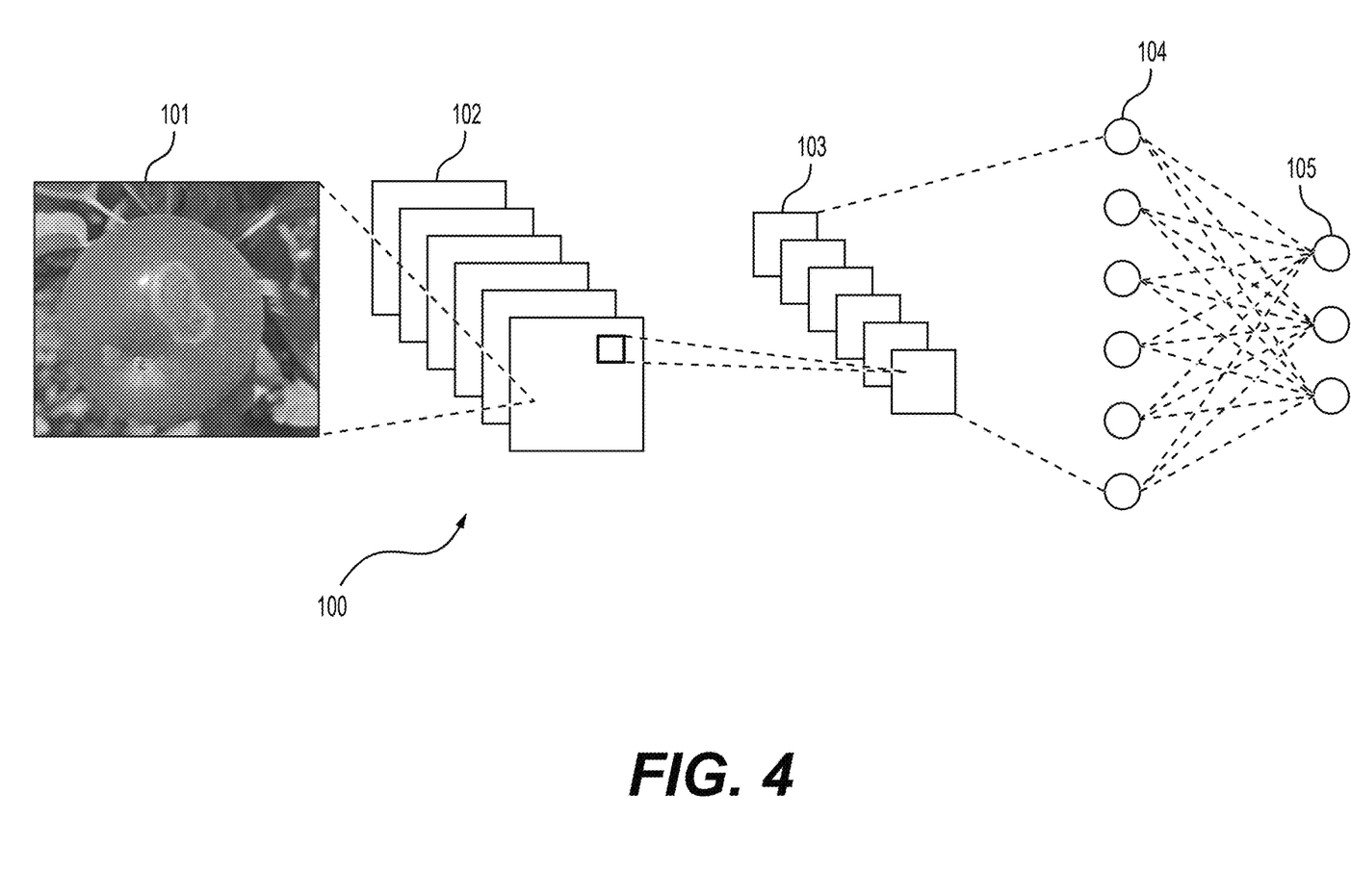
FIG. 4 is a diagram of layers used in a convolutional neural network of a system for detecting diseases in plants.

Turning to FIG. 4, an example convolutional neural network (CNN) 100 is shown which may be programmed on the high-level controller 26 of the mobile robot 4. In its basic form, the CNN 100 receives an input image 101 which is passed through a convolution layer 102, pooling layer 103, fully connected layer 104, and output layer 105. Convolution layer 102 is the foundation of CNN 100, responsible for detecting features in the image, such as edges, textures, and patterns. A filter, or kernel, which is a small matrix such as 3×3 or 5×5, slides in a convoluted pattern across the pixels of input image 101. The filter performs element-wise multiplication with the underlying pixels and sums the result, producing a feature map. Each filter detects a specific feature, with multiple filters applied to capture diverse features from the same image 101. The output result is a set of feature maps that represent the presence and intensity of features across different locations in the image 101.

Pooling layer 103 reduces the dimensionality of feature maps, making computation more efficient and focusing on important features while discarding less important details. Max pooling selects the maximum value in a small region (e.g., a 2×2 or 3×3 area) to keep the most prominent feature in that region. Average pooling takes the average of values in each region, which can smooth the feature maps, but is less common in practice.

Fully connected layer 104 classifies the image based on the features extracted by the convolution 102 and pooling 103 layers. Although one fully connected (FC) layer 104 is shown for explanation purposes, multiple FC layers may be included in which every node or neuron is connected to every neuron in the previous layer, similar to a traditional neural network. Feature maps from the pooling layers are flattened or converted into a one-dimensional vector and fed into the fully connected layers, which process them to make the final prediction. The output of the final fully connected layer often corresponds to class scores or probabilities, indicating the likelihood of a classification being present in the image.

The output layer 105 provides the final prediction or decision based on the learned features, based on an activation function to convert final scores into class probabilities. In the case of the present system, output layer 105 represents probabilities of a particular plant name and disease type. For classification, the output layer 105 typically uses an activation function to convert final scores into probabilities.

Training the CNN

Figure 5A:
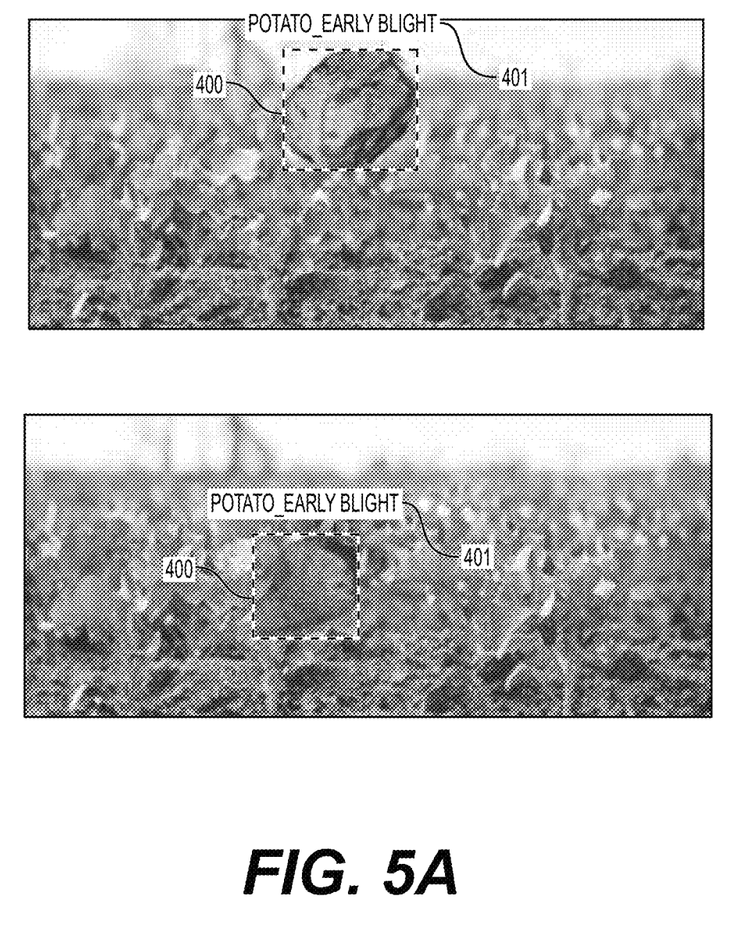
FIG. 5A shows photographic images with applied bounding boxes and labels used in a system for detecting diseases in plants.
Figure 5B:
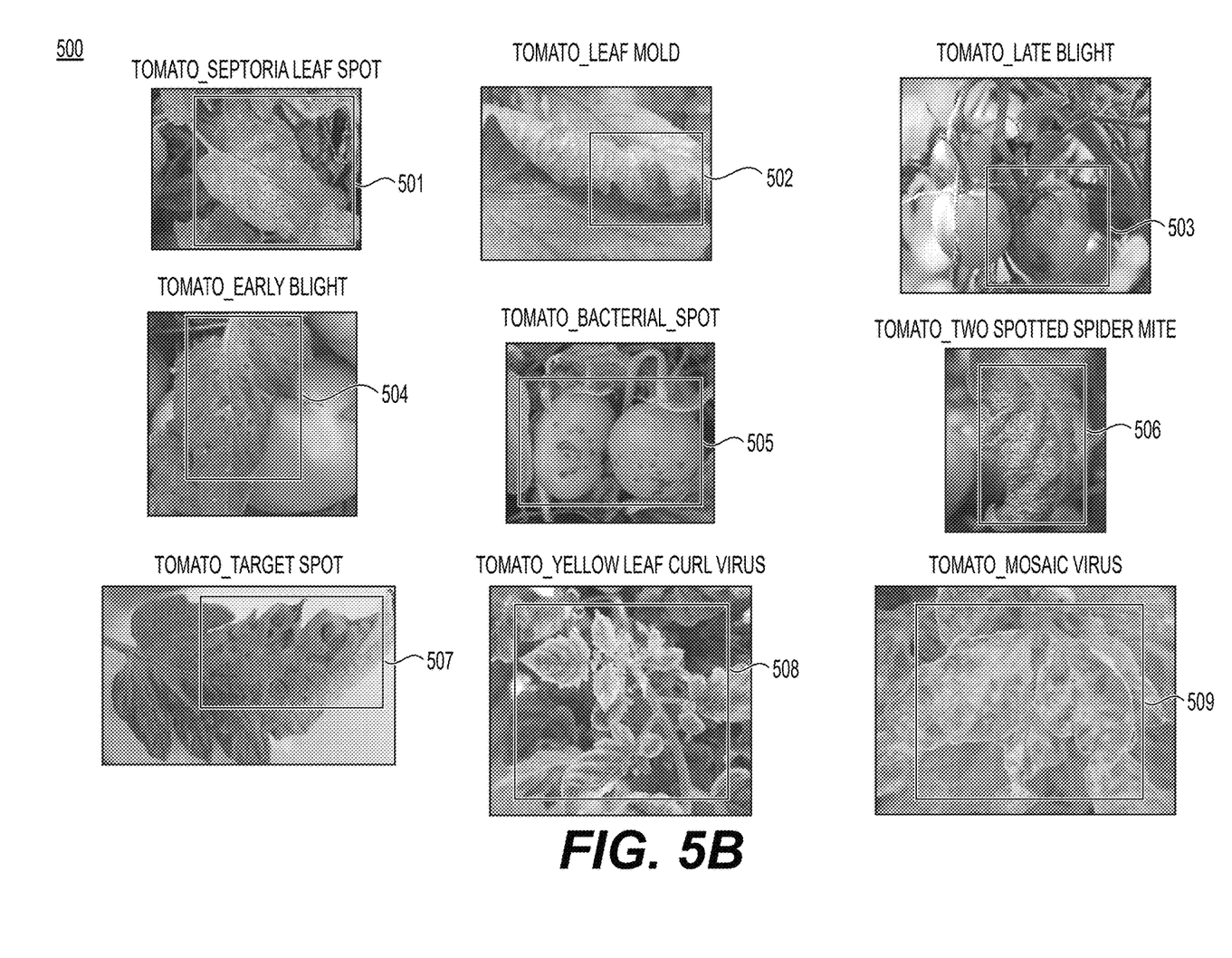
FIG. 5B shows an example image dataset with applied bounding boxes and labels used in a system for detecting diseases in plants.

Further provided herein is a method of training the convolutional neural network using a dataset of photographic images of various plant types and disease types associated with each plant type. Referring to FIGS. 5A-B the dataset of photographic images may include bounding boxes 400 with labels 401 highlighting areas of interest such as plant type and disease type of the photographic images. In a non-limiting embodiment, a plant type may be associated with an image taken by the camera from among corn, potato, cherry, apple and tomato. In the dataset 500 of FIG. 5b, exemplary diseases associated with the plant types are shown. For tomato, the associated diseases applied as bounding box and label may include *septoria* leaf spot 501, leaf mold 502, late blight 503, early blight 504, bacterial spot 505, two spotted spider mite 506, target spot 507, yellow leaf curl virus 508, mosaic virus 509. For corn, the associated diseases applied as bounding box and label may include grey leaf spot 510, common rust 511, and northern leaf blight 512. For potato, the associated disease type and label may include late blight 513, and early blight 514. For apple, the associated disease type and label may include cedar apple rust 515, black rot 516, and apple scab 517. For cherry, the associated disease type and label may include powdery mildew 518. Although specific embodiments are provided, such embodiments are non-limiting and other plant types and disease types may be supported within the teachings of the present disclosure.

In training the CNN, an unprocessed data set and processed data set are used. The unprocessed data set include the plant images with various diseases, and the processed data set include the images with labelled bounding boxes applied. The unprocessed and processed data sets should include the same images, with the only difference being the application of labelled bounding boxes in the processed data set. Various annotation platforms are available to perform the bounding box labelling manually, including Roboflow, LabelMe, CVAT, and Labelbox to name a few.

Once the image dataset has been obtained, including the processed data set with labelled bounding boxes, the CNN model may be trained. A particular CNN may be a YOLOv8 model. The preprocessed images are fed into the CNN in forward passes for feature extraction by the convolutional layers. The CNN will predict potential bounding boxes for objects (the diseased regions of the plants). For each box the CNN will predict bounding box coordinates (x, y, width, height), and a confidence score that a box contains an object, as well as class probabilities (i.e. plant and disease type). The CNN compares its predictions with the processed dataset, which includes the prepared bounding boxes and labels, to compute a loss function. In the case of a YOLO CNN, a localization loss, confidence loss, and classification loss are computed and combined in a weighted sum. Errors from the loss function are propagated backward to adjust the CNN's weights. An optimizer then updates weights to minimize the loss.

The process is repeated for multiple epochs, or complete passes through the dataset. After each epoch, the CNN is evaluated on a validation dataset, a select number of images from the dataset used for comparing output of the CNN with the ground truth (i.e. correct result). During evaluation, performance metrics may be computed including intersection over union (IoU), which measures overlap between the predicted and ground truth boxes. Mean average precision (mAP) may also be computed, which is the average precision over all classes and IoU thresholds. The results may be used to adjust hyperparameters such as, for example, the number and size of kernels in each convolution layer, the size of the stride, and size of the kernels in the pooling layer.

In addition, when the CNN model predicts bounding boxes for an image, several post-processing techniques may refine the output, including non-maximum suppression (NMS), which eliminates redundant bounding boxes for the same object by keeping the box with the highest confidence score. Thresholding may be used as well, which is the discarding of predictions with low confidence scores. The final trained model is saved to memory, in this case the memory of the high-level controller of the mobile robot. The model may then be used in real-world applications.

It is to be understood that the systems and methods for detecting diseases among plants are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A system for detecting diseases among plants, comprising:
   a mobile device;
   a mobile robot including a power supply, a housing unit, and further comprising:
      a camera;
      a navigation unit;
      a GPS unit;
      a wireless transmitter;
      a traction component mounted to the housing unit;
      a geared motor driving the traction component, wherein the geared motor and the traction component provide motive force for the mobile robot;
      a motor driver connected to the geared motor;
      a low-level controller configured to control operation of the geared motor and the motor driver;
      a high-level controller connected to the camera, the navigation unit, and the GPS unit, and programmed with a convolutional neural network configured to process images taken by the camera, the high-level controller associating each image with a plant type, disease type, and location of where the image was taken;
      a dataset of photographic images, including photographic images of various plant types and disease types associated with each plant type, wherein the convolutional neural network is trained using images from the dataset of photographic images;
      wherein the dataset of photographic images includes a processed dataset with labelled bounding boxes highlighting areas of interest and identifying plant type and disease type on the photographic images; and
      wherein the mobile device and mobile robot are programmed with a mobile application such that the mobile device receives an image of a plant and data from the mobile robot, the data comprising a plant name, disease type and location associated with the plant shown in the image.

2. The system for detecting diseases among plants according to claim 1, wherein the system includes four geared motors and two motor drivers, each motor driver connected to two respective geared motors driving two wheels.

3. The system for detecting diseases among plants according to claim 1, wherein the navigation unit is a light detection and ranging based navigation unit.

4. The system for detecting diseases among plants according to claim 1, wherein the high-level controller is connected to the low-level controller and configured to control motion of the robot wheels based on input from the camera, the GPS and the navigation system.

5. The system for detecting diseases among plants according to claim 1, wherein the low-level controller includes a microprocessor, pulse width modulated (PWM) channels, analog, and digital channels.

6. The system for detecting diseases among plants according to claim 5, wherein the low-level controller includes a serial peripheral interface (SPI).

7. The system for detecting diseases among plants according to claim 1, wherein the convolutional neural network is a you-only-look-once (YOLO) model.

8. A method of detecting diseases among plants, the method comprising:

navigating a mobile robot in a crop field, wherein the mobile robot is equipped with a power supply, a housing unit, a camera, a navigation unit, a GPS unit, a traction component mounted to the housing unit, a geared motor, a motor driver, a low-level controller configured to control operation of the geared motor and the motor driver, and a high-level controller connected to the camera, the navigation unit, and the GPS unit, the high-level controller programmed with a convolutional neural network;

training the convolutional neural network using a dataset of photographic images of various plant types and disease types associated with each plant type and processing the dataset of photographic images by applying labelled bounding boxes highlighting areas of interest and identifying plant type and disease type on the photographic images;

taking an image of a plant in the crop field using the camera;

processing the image taken by the camera using the high-level controller;

associating with the image a plant type, disease type, and location of where the image was taken; and sending the image, plant type, disease type and location of where the image was taken to a remote computing device.

9. The method of detecting diseases among plants as recited in claim 8, further comprising, applying bounding boxes and labels to images of corn plants within the dataset of photographic images, including labels for grey leaf spot, common rust, and northern leaf blight.

10. The method of detecting diseases among plants according to claim 8, further comprising, applying bounding boxes and labels to images of tomato plants within the dataset of photographic images and including labels for bacterial spot, early blight, late blight, leaf mold, *septoria* leaf spot, two spotted spider mite, target spot, yellow leaf curl virus, and mosaic virus.

11. The method of detecting diseases among plants according to claim 8, further comprising, applying bounding boxes and labels to images of potato plants and cherry plants with the dataset of photographic images and including labels for early blight, late blight, and powdery mildew.

12. The method of detecting diseases among plants according to claim 8, further comprising, applying bounding boxes and labels to images of apple plants within the dataset of photographic images and including labels for apple scab, black rot, and cedar apple rust.

13. The method of detecting diseases among plants as recited in claim 8, wherein the traction component of the mobile robot includes four wheels and wherein a geared motor is coupled to each wheel.

14. The method of detecting diseases among plants as recited in claim 8, wherein the mobile robot is navigated using a light detection and ranging based navigation unit.

15. The method of detecting diseases among plants as recited in claim 8, further comprising, sending signals from the high-level controller to the low-level controller for control of the geared motor and motor driver based on input from the GPS and navigation unit.

16. The method of detecting diseases among plants as recited in claim 8, wherein the convolutional neural network is a you only look once model.

* * * * *